United States Patent
Rookes et al.

[11] Patent Number: 5,992,821
[45] Date of Patent: Nov. 30, 1999

[54] ELECTRO-MAGNETICALLY OPERATED VALVE

[75] Inventors: Iain Rookes; Paul John Smith, both of Cambridgeshire; Daniel Charmbury Ward, Bath, all of United Kingdom

[73] Assignee: Perkins Engines Company Limited, Cambridgeshire, United Kingdom

[21] Appl. No.: 08/835,650

[22] Filed: Apr. 10, 1997

[30] Foreign Application Priority Data

Jul. 1, 1996 [GB] United Kingdom ................ 9613730

[51] Int. Cl.⁶ .............................. F16K 31/06; H01F 3/00
[52] U.S. Cl. ........................................ 251/129.1; 335/279
[58] Field of Search ........................... 251/129.1, 129.15; 335/266, 268, 279, 281

[56] References Cited

U.S. PATENT DOCUMENTS

| | | | |
|---|---|---|---|
| 3,573,690 | 4/1971 | Jones et al. ............................ | 335/279 |
| 3,743,898 | 7/1973 | Sturman ................................. | 317/154 |
| 4,114,648 | 9/1978 | Nakajima et al. .................... | 137/625.5 |
| 4,168,688 | 9/1979 | Bart ....................................... | 123/139 |
| 4,231,525 | 11/1980 | Palma ..................................... | 239/585 |
| 5,460,329 | 10/1995 | Sturman ................................. | 239/96 |
| 5,479,901 | 1/1996 | Gibson et al. ......................... | 123/472 |
| 5,488,340 | 1/1996 | Maley .................................... | 335/253 |

*Primary Examiner*—John Rivell
*Attorney, Agent, or Firm*—Nilles & Nilles SC

[57] ABSTRACT

An electro-magnetically operated valve which has a pole piece, an armature member mounted for movement relative to the pole piece, and an electro-magnetic device associated with the pole piece for effecting movement of the armature member between a first position spaced from the pole piece to a second position where the armature member contacts the pole piece, where at least a portion of the armature member and/or the pole piece has in or on a coating or layer of material having a higher mechanical hardness or a higher magnetic permeability than the material of the armature and/or pole piece.

19 Claims, 3 Drawing Sheets

ELECTRO-MAGNETICALLY OPERATED VALVE

BACKGROUND OF THE INVENTION

1. Field of the Invention

The present invention relates to an electro-magnetically operated valve and, in particular, to a two-coil solenoid valve (TCV) for use in an internal combustion (i.c.) engine fuel injection system.

High-pressure, electronically controlled i.c. engine fuel injection systems require valves offering fast and precise switching between fuel flow ports. Poppet valves which have typically been employed in fuel injection systems do not generally offer sufficiently fast switching rates for modern fuel injection systems. Also, poppet valves are known to suffer from "valve bounce", whereby the valve member on moving to a switched position momentarily rebounds from its end stop. The bouncing of the valve member can adversely affect control of fluid amounts passing through the valve and this can be critical to improving the performance of i.c. engines to increase fuel consumption efficiency and reduce undesirable exhaust emissions.

It is therefore becoming increasingly common to employ TCV's in i.c. engine fuel injection systems. A typical TCV comprises a metallic spool valve member mounted in a housing for axial movement between two pole pieces. Solenoid coils located in the pole pieces are selectively controlled to effect movement of the spool valve member between the two pole pieces. The spool valve member may have axially extending bores formed therein or radially extending grooves formed in its outer surface which afford communication between selected ports of the valve dependent on the controlled position of the valve member within the housing. U.S. Pat. No. 4,168,688 discloses a spool valve type TCV which has a hollow spool valve member.

Magnetic remanence (or residual magnetism) in the material of the pole pieces is often regarded as a problem to be overcome in electro-magnetically operated valves since it provides a resistance to movement of the valve member away from a pole piece. The "capture", of the valve member at rest by the magnetic remanence of a pole piece to which it is adjacent can lead to undesirable switching delays. However, as disclosed in U.S. Pat. No. 3,743,898, the magnetic remanence of the pole pieces can be put to good effect in electro-magnetically operated valves where it is desired to limit electrical energy consumption, for example in low-voltage systems such as vehicle battery systems. The magnetic remanence can be employed to latch the valve member to a pole piece when the valve member is at rest after having been caused to switch position. Thus, when the valve member is at rest, the valve does not consume electrical energy. The use of magnetic remanence in this way can also negate the need to incorporate biasing means such as springs in the valve thus simplifying the valve's structure.

A minimum level of remanence in the pole pieces is necessary in order to latch the valve member after it has moved and an energised coil that caused it to move has been de-energised, but it is equally important that a maximum desired level of remanence in the pole pieces is not exceeded. Should the maximum desired level of remanence in the pole pieces be exceeded, this can affect the performance of the valve in two ways. Firstly, the allowable peak electrical current in a coil may not produce sufficient pull on the valve member to remove it from its latched position and an increase in the coil magnetising current may cause heat dissipation and other problems. Secondly, an excessive level of remanence will distort the timing performance of the valve. It becomes increasingly difficult, with increasing levels of remanence, to determine the release time of the valve member from the pole piece to which it is latched where the pulling force of the attracting coil is not substantially greater than the latching force exerted by the latching pole piece.

A known method of reducing the magnetic remanent force acting on the valve member is to reduce contact between the valve member and an adjacent pole piece. This can be achieved by providing a stepped portion on either or both the valve member and pole piece such that the area of contact between the valve member and the pole piece is minimised and the valve member is effectively held at a distance from the pole piece.

A problem particularly relevant to the use of TCV's in i.c. engine fuel injection systems, however, is the detrimental effects of wear between the ends of the valve member which contact the pole pieces and the parts of the pole pieces which act as end stops for the valve member. Ordinarily, the metallic material of the pole pieces and the valve member is relatively magnetically soft in order to control the level of magnetic remanence in the pole pieces and to a lesser degree in the valve member, but this material tends to also be mechanically soft and is therefore susceptible to wear. Wear caused by the repeated hammering of the valve member on the pole pieces will distort the operation efficiency of the valve. In particular, when the valve member and/or the pole pieces are provided with a stepped portion to reduce contact therebetween, the repeated hammering of the valve member on the pole pieces caused by the high speed, high frequency operation of the valve will lead to plastic deformation of the stepped portion and also possibly of the valve member and pole pieces and will allow the valve member to move into closer contact than intended with the pole pieces. This will affect the switching precision of the valve and will cause the valve member to be more firmly latched to the pole pieces thus requiring greater magnetising coil currents to effect its removal from the pole pieces on switching.

2. Description of the Prior Art

The abovementioned problem has been addressed in U.S. Pat. No. 5,488,340 in which the compositions and treatment of the metallic materials of the valve member and the pole pieces are specified in order to provide a material of increased mechanical hardness so as to reduce its susceptibility to wear. However, whilst the solution proposed in U.S. Pat. No. 5,488,340 goes some way to addressing the problem of wear, it fails to provide a means of ensuring that the level of magnetic remanence in the pole pieces remains generally constant over the anticipated life of the valve.

OBJECTS AND SUMMARY OF THE INVENTION

It is a first object of the present invention to provide an electro-magnetically operated valve in which at least a portion of a valve member and/or a portion of a pole piece with which the valve member contacts is provided with a hard wearing coating or layer to withstand the impact forces occurring between the valve member and the pole piece during operation of the valve.

It is a second object of the present invention to provide an electro-magnetically operated valve in which at least a portion of a valve member and/or a portion of a pole piece with which the valve member contacts is provided with a coating or layer of a material with relatively low magnetic properties having a specified thickness in order to provide a specified level of magnetic remanence in at least the pole piece.

According to a first aspect of the present invention, there is provided an electro-magnetically operated valve comprising a pole piece, an armature member mounted for movement relative to said pole piece and an electromagnetic device associated with said pole piece for effecting movement of said armature member between a first position spaced from said pole piece to a second position where said armature member contacts said pole piece, wherein at least a portion of said armature member which contacts with the pole piece and/or at least a portion of the pole piece which contacts with the armature member has attached thereto a coating or layer of material having a mechanical hardness greater than the hardness of a material from which the armature member or the pole piece is formed.

Preferably, the layer of material has a magnetic permeability less than that of a material from which the armature member or the pole piece is formed.

According to a second aspect of the present invention, there is provided an electro-magnetically operated valve comprising a pole piece, an armature member mounted for movement relative to said pole piece, and an electro-magnetic device associated with said pole piece for effecting movement of said armature member between a first position spaced from said pole piece to a second position where said armature member contacts said pole piece, wherein at least a portion of said armature member which contacts with the pole piece and/or at least a portion of the pole piece which contacts with the armature member has attached thereto a coating or layer of material having a magnetic permeability less than that of a material from which the armature member or the pole piece is formed.

Preferably the layer of material has a mechanical hardness greater than that of a material from which the armature member or the pole piece is formed.

Preferably, the layer of material extends on the portion of the armature member and/or the portion of the pole piece over a full area of contact between the armature member and the pole piece.

Preferably, the layer of material is attached to the end of the armature member and/or the pole piece by spray bonding.

Alternatively, the layer of material may be attached to the armature member and/or the pole piece by forming said material into a suitable shape and bonding said shaped material to the end of the armature member and/or the pole piece.

Preferably, the layer of material has a predetermined thickness.

Preferably, the material of the layer is tungsten carbide or any other suitable durable, non-magnetic or low-magnetic material.

Preferably, the electro-magnetically operated valve is a two-coil solenoid valve (TCV) including a housing member in which the armature member is mounted for axial movement between pole pieces located at respective ends of the housing member and each end of the armature member and/or each pole piece has attached thereto a coating or layer of a material having a mechanical hardness greater than that of a material from which the armature member or pole pieces are formed or a magnetic permeability less than that of a material from which the armature member or the pole pieces are formed.

According to a third aspect of the present invention there is provided an internal combustion fuel injection system including an electro-magnetically operated valve in accordance with the next ten preceding paragraphs.

According to a fourth aspect of the present invention, there is provided a method of forming a pole piece for an electro-magnetically operated valve in accordance with the next ten but one preceding paragraphs, said method comprising the steps of forming a pole piece from a magnetic metallic material, said pole piece being formed with an end wall and a tubular mounting flange extending outwardly therefrom, said mounting flange, in use, attaching to a housing of the valve, and on an inner side of the mounting flange a central portion also extending outwardly from the end wall, said central portion having a height of a predetermined amount less than a height of the mounting flange; and attaching to an end face of said central portion a coating or layer of material having a thickness greater than the difference in height between the central portion and the mounting flange, the material of said coating or layer having a mechanical hardness greater than the material of the pole piece and/or having a magnetic permeability less than the material of the pole piece; and machining an end face of the mounting flange and central portion to which the coating or layer of material is attached to thereby reduce the thickness of the coating or layer of material to a predetermined depth.

BRIEF DESCRIPTION OF THE DRAWINGS

The foregoing and further features of the present invention will be more readily understood from the following description of a preferred embodiment, by way of example thereof, with reference to the accompanying drawings, of which.

DESCRIPTION OF THE PREFERRED EMBODIMENTS

Figure 1:
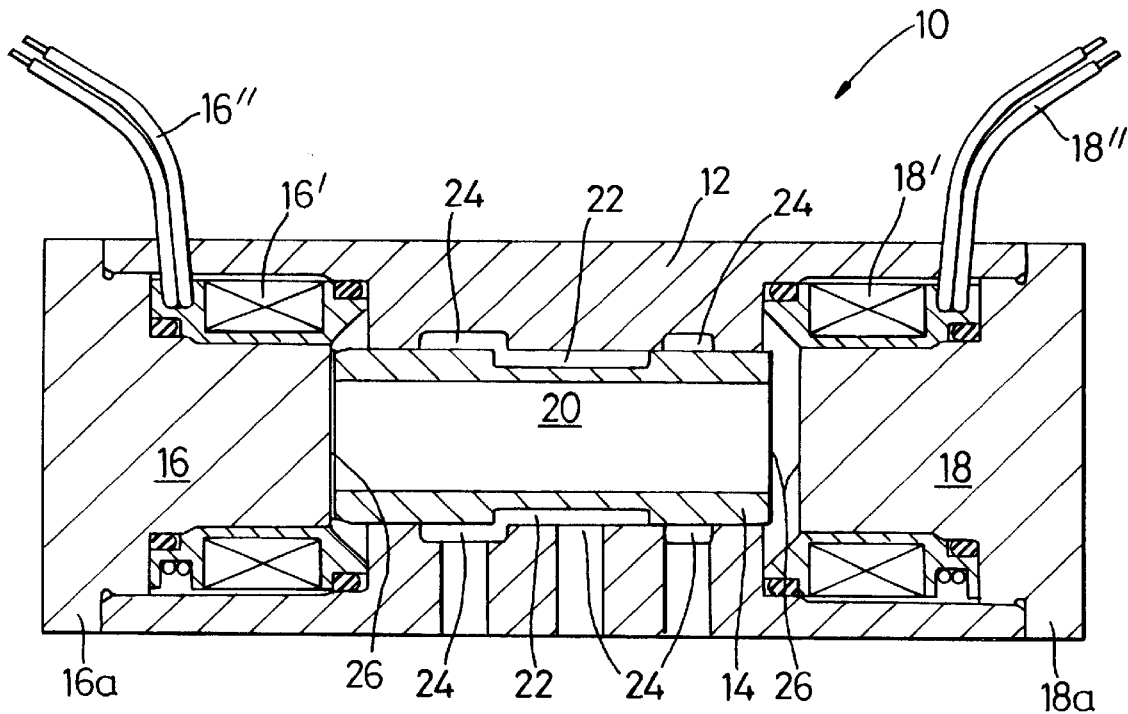
FIG. 1 is a schematic cross-sectional elevation of a two-coil solenoid valve in accordance with the present invention.

Referring to the drawings, FIG. 1 illustrates a two-coil solenoid valve 10 in accordance with the invention. The valve comprises a housing 12 in which an armature member 14 (spool valve member) is mounted for axial movement between first and second pole pieces (16,18). Each pole piece (16,18) includes a solenoid coil (16',18') and electrical supply means (16",18") for supply of energising currents to the solenoid coils. Each pole piece (16,18) has an annular flange member (16a,16b) by which it is secured to the housing 12 of the valve. In use, the solenoid coils (16',18') are selectively energised to cause movement of the valve member 14 from a position adjacent to one of the pole pieces (16,18). The solenoid coils may be selectively energised in accordance with a number of different methods, but in the following description it will be assumed that the method of selectively energising the solenoid coils is a conventional one. In other words, to cause the valve member 14 to move from say a first position in contact with the first pole piece 16 to a second position in contact with the second pole piece 18, it will be necessary to only energise the solenoid coil 18' of the second pole piece 18. The valve member 14 is of the balanced spool valve type having a longitudinally extending central bore 20 which allows fluid trapped in the centre of the valve 10 to flow freely between the ends of the valve member 14 without hindering movement of the valve member between the pole pieces. The valve member 14 has at least one radially extending groove 22 formed in its outer surface which afford communication between selected ports 24 of the valve 10 dependent on whether the valve member 14 is located in its first position or its second position.

In use, one of the solenoid coils (16',18') is selectively energised only for a time sufficient to cause the valve member 14 to move from one of its positions to the other. When the valve member 14 is at rest, the energised coil is de-energised but the valve member 14 is held in its at rest position in contact with one of the pole pieces (16,18) by the magnetic remanence (residual magnetism) of that pole piece (16,18). The use of the magnetic remanence of the pole pieces to latch the spool valve member 14 in its at rest positions is particularly useful in battery operated systems such as those employed in internal combustion engines.

In modern fuel injection systems for internal combustion engines, two-coil solenoid valves of the above type are employed to provide precise switching between fluid flow ports and to provide high switching rates with minimum electrical energy consumption. Whilst the valve is designed such that the valve member only travels a relatively small distance compared to its length when moving between its first and second positions, the speed of movement of the valve member results in high impact forces being generated between the ends of the valve member and the parts of the pole pieces which act as end stops for the valve member.

Figure 2:
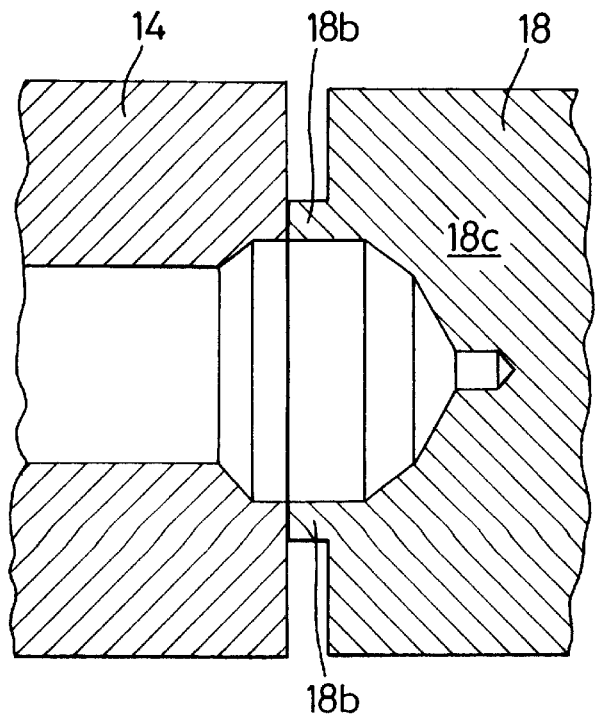
FIG. 2 is an enlarged partial cross-sectional elevation illustrating the contact between an armature member and a pole piece in a conventional two-coil solenoid valve.

FIG. 2 is an enlarged partial cross-sectional view illustrating the contact between an end of a valve member and a pole piece in a conventional two-coil solenoid valve. In the description of the conventional valve, like numerals will be used to denote like parts. The level of magnetic remanence in the pole piece 18 is dictated by several factors including the material of the pole piece 18 and the magnitude and duration of the energising currents fed to the respective solenoid coil (not shown). In order to exert some measure of control over the remanent force exerted by the pole piece 18 on the valve member 14, it is known to provide the pole piece with a stepped portion 18b which reduces the contact between the valve member 14 and the pole piece 18 and which effectively spaces the valve member 14 a small distance away from the pole piece 18. In this way, the magnetic remanent force acting on the valve member 14 is controlled to remain below a maximum desirable level which, if it was exceeded, might prevent the valve member 14 from being magnetically unlatched from the pole piece 18 under the influence of an attractive force exerted by a solenoid coil of an opposing pole piece (not shown). However, since the material of the pole piece 18 is generally mechanically soft, a problem occurs in that the stepped portion 18b of the pole piece becomes deformed over time due to the hammering effect of the valve member on the pole piece during valve operation. In time, the deformation of the stepped portion 18b can be such that the armature member 14 is able to move more closely to the main body 18c of the pole piece 18 thus affecting the switching position of the valve. Also, the magnetic remanent force acting on the valve member 14 increases due to it being able to move more closely to the main body 18c of the pole piece 18.

As hereinbefore mentioned, it is known from U.S. Pat. No. 5,488,340 to carefully specify the compositions of the metallic materials from which the valve member and pole pieces are formed in order to provide harder magnetic materials which will be more wear resistant. Despite this, the problem of providing a generally constant level of magnetic remanence in the pole pieces over the life of the valve remains.

Figure 3:
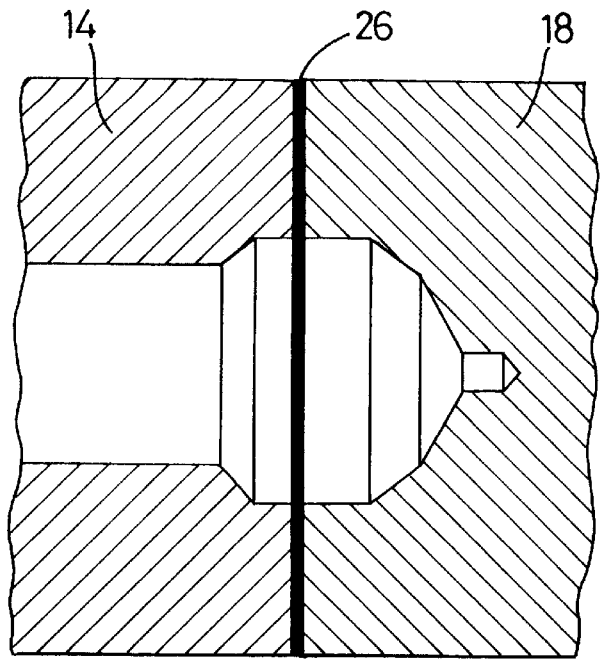
FIG. 3 is an enlarged partial cross-sectional elevation illustrating the contact between an armature member and a pole piece in the valve of the present invention.

FIG. 3 illustrates an enlarged partial cross-sectional view illustrating the contact between a valve member 14 and a pole piece 18 in a valve 10 in accordance with the present invention. The end faces of the pole piece 18 and the valve member 14 are provided with a coating or layer of material 26 which serves to strengthen the surface to which it is applied and to provide a precise control of magnetic remanence levels in the pole pieces 18 over an extended period of time.

The material of the layer 26 is chosen to be durable and preferably non-magnetic although a suitable durable material of low-magnetic properties could be employed. The coating material 26 may be tungsten carbide. The material may be spray bonded onto the end faces of the pole piece 18 or valve member 14 by, for example, the "Jet Kotell" process. "Jet Kote" is a trademark of Deloro Stellite Limited. Alternatively, the coating material may be formed from sintered material into a suitable shape for sinter bonding to the end faces of the pole piece 18 and/or valve member 14. It will be appreciated that, whilst it is preferable to coat the end faces of both the pole piece 18 and the valve member 14 with the durable low-magnetic property material, it is possible to coat only one of said components which, of course, is more economical.

Figure 4:
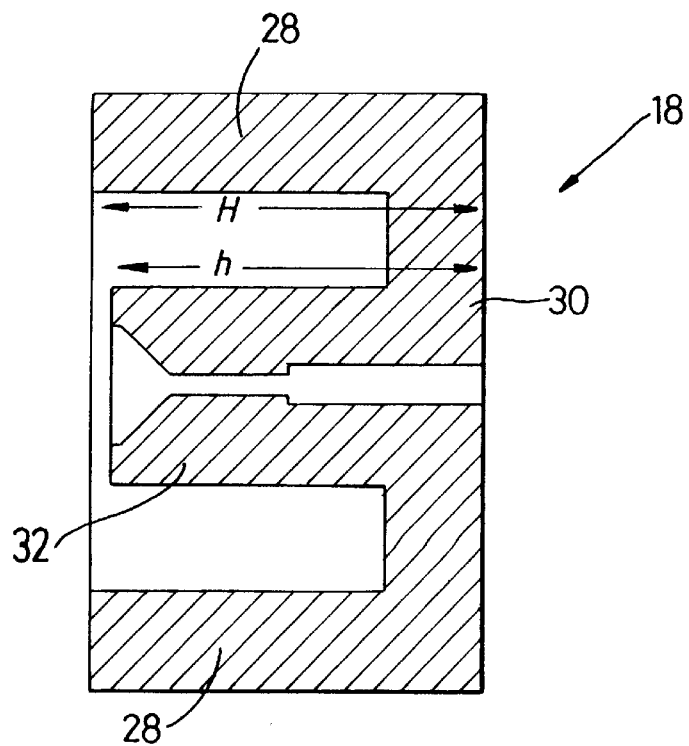
FIG. 4 is an enlarged cross-sectional elevation of a pole piece for use in the valve of the present invention before attachment of the coating or layer of material.
Figure 5:
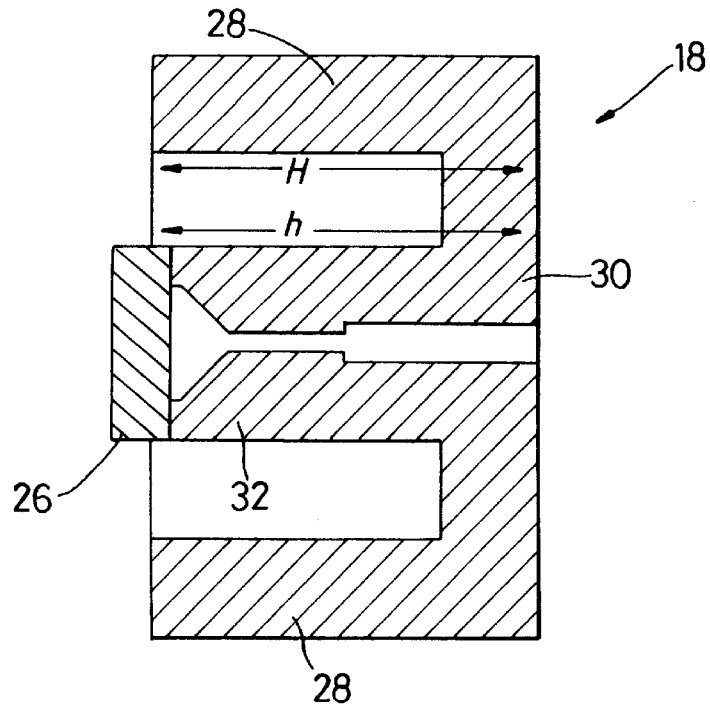
FIG. 5 is an enlarged cross-sectional elevation of a pole piece for use in the valve of the present invention after attachment of the coating or layer of material but prior to machining of the end faces of the pole piece.
Figure 6:
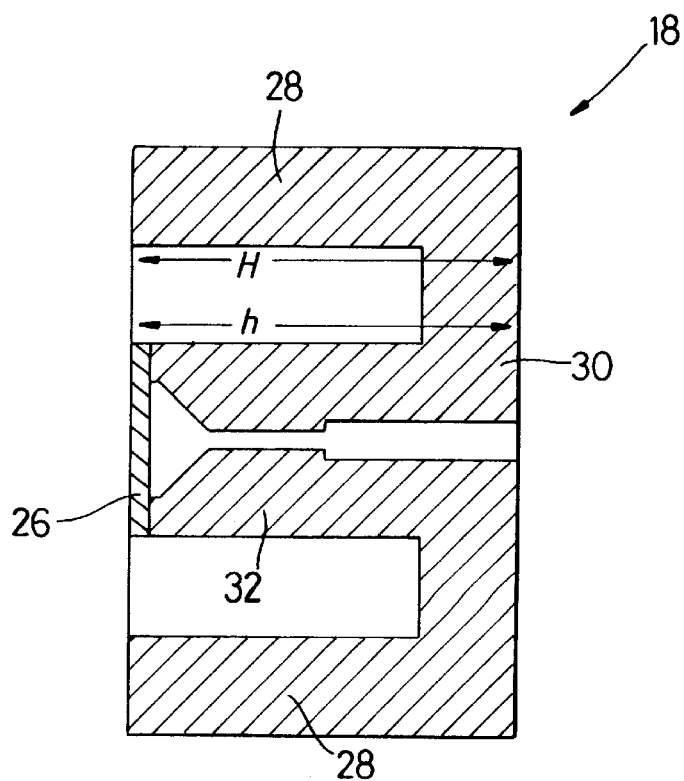
FIG. 6 is an enlarged cross-sectional elevation of a pole piece for use in the valve of the present invention after the end faces of said pole piece have been machined ready for attachment to a housing of the valve.

The coating material may be applied to a thickness of between 0.05 to 0.3 mm, dependent on the level of remanent force to be exerted on the valve member 14 by a pole piece 18. Small variations in the predetermined thickness of the layer of material 26 can have a significant effect on valve performance and therefore it is necessary to pay close attention to tolerances during the process of attaching or bonding the layer 26 to the valve member 14 and/or pole pieces 18. FIGS. 4 to 6 illustrate a method by which a specified thickness of a layer 26 of suitable material can be spray bonded to an end face of an armature contacting portion of a pole piece and formed to a predetermined thickness.

FIG. 4 is an enlarged cross-sectional elevation of a pole piece 18 for use in the electro-magnetically operated valve of the invention. The pole piece 18 differs from the pole pieces forming part of the valve illustrated in FIG. 1 in that it includes a generally tubular shaped mounting flange 28 extending outwardly from an end wall 30 of the pole piece 18 rather than having an annular flange (16a, 18a) as in the pole pieces illustrated in FIG. 1. The pole piece 18 is formed to have an inner central portion 32 having a height h which is less than a height H of the tubular mounting flange 28.

FIG. 5 illustrates the next step in the method wherein a layer of suitable material 26 is spray bonded onto an end face of the armature contacting portion 32 of the pole piece 18. The thickness of the layer 26 spray coated onto the armature contacting portion 32 is such that the combined height h of the contacting portion 32 and the layer 26 of material exceeds the height H of the flange mounting portion 28.

FIG. 6 illustrates a final step in the method in which the end face of the pole piece 18 is machined to reduce the thickness of the layer 26 of material to a predetermined amount. At the same time, the end face of the mounting flange 28 is machined to prepare it for mounting to the housing (not shown) of the valve.

This method has the advantage that, since the end faces of the mounting flange portion 28 and central portion 32 are machined at the same time, it is possible to ensure that the surface of the added layer of material 26 will, in use, be perpendicular to axial movement of the valve member 14. It is possible with this method to add a layer of material to a thickness having a tolerance of +/−0.01 mm.

By coating the end faces of the pole pieces and/or armature member with a material as hereinbefore described, it is possible to choose the material forming the main parts of the pole pieces and armature member for properties other than hardness, etc. For example, the pole piece and armature member materials may be chosen to have properties which render manufacture therefrom less difficult or the material of the armature member may be chosen to have good resistance to sliding wear. This design freedom makes manufacture more economical.

It will be understood from the above that the description of the present invention in its preferred form has been given with respect to a two-coil solenoid valve but it will be appreciated that the present invention can be applied to any electro-magnetically operated valve in which a valve member makes contact with a pole piece.

We claim:

1. An electro-magnetically operated valve comprising a pole piece made of a material, an armature member mounted for movement relative to said pole piece and an electro-magnetic device associated with said pole piece for effecting movement of said armature member between a first position spaced from said pole piece and a second position where said armature member contacts said pole piece, wherein said pole piece has a portion disposed toward said armature that comprises an end wall having a) a tubular mounting flange extending outwardly therefrom a height, said mounting flange engaging a housing of the valve, b) a central portion disposed inwardly of said mounting flange having 1) an end face disposed toward said armature, and 2) a height of less than said height of said mounting flange, and c) a coating or layer of a material attached to said end face, said coating or layer having 1) a thickness substantially equal to a difference between said height of said mounting flange and said height of said end face, and 2) a mechanical hardness greater than the mechanical hardness of said material of said pole piece.

2. A valve as claimed in claim 1, wherein said coating or layer is comprised of a material that has a magnetic permeability less than that of said material from which said pole piece is comprised.

3. A valve as claimed in claim 1, wherein said coating or layer extends over a full area of contact between said armature member and said pole piece.

4. A valve as claimed in claim 1, wherein said coating or layer is spray bonded to at least one of said armature member and said pole piece.

5. A valve as claimed in claim 1, wherein said layer comprises a preformed member that is bonded to at least one of said pole piece and said armature member.

6. A valve as claimed in claim 1, wherein said layer or coating has a predetermined thickness.

7. A valve as claimed in claim 1, wherein the layer or coating is comprised of a non-magnetic or a low-magnetic material.

8. A valve as claimed in claim 1 wherein the valve comprises a fuel injection valve of a fuel injection system for controlling flow of a fuel through said fuel injection valve.

9. A valve as claimed in claim 8 wherein a) said fuel injection valve includes a housing with a pair of said pole pieces that are spaced apart from each other and each carried by said housing defining a chamber therein having one of said pole pieces disposed at one end of said chamber and another of said pole pieces disposed at the other end of said chamber, b) one of said pole pieces includes a first solenoid coil carried by said one of said pole pieces, c) another of said pole pieces includes a second solenoid coil carried by said another of said pole pieces, d) said armature member is received in said chamber and disposed between said pair of pole pieces, e) said armature has a pair of spaced apart ends with one of said ends disposed toward said one of said pole pieces and another of said ends disposed toward said another of said pole pieces, f) a first said layer or coating is disposed between said one of said ends of said armature and said one of said pole pieces, and g) a second said layer or coating is disposed between said another of said ends of said armature and said another of said pole pieces.

10. The valve as claimed in claim 8 wherein each said layer or coating has a thickness of between 0.05 mm and 0.3 mm.

11. An electro-magnetically operated valve comprising a pole piece, an armature member mounted for movement relative to said pole piece, and an electro-magnetic device associated with said pole piece for effecting movement of said armature member between a first position spaced from said pole piece and a second position where said armature member contacts said pole piece, wherein said pole piece has a portion disposed toward said armature that comprises an end wall having a) a tubular mounting flange extending outwardly therefrom a height, said mounting flange engaging a housing of the valve, b) a central portion disposed inwardly of said mounting flange having 1) an end face disposed toward said armature, and 2) a height of less than said height of said mounting flange, and c) a coating or layer of a material attached to said end face, said coating or layer having 1) a thickness substantially equal to a difference between said height of said mounting flange and said height of said end face, 2) a mechanical hardness greater than the mechanical hardness of said material of said pole piece, and 3) a magnetic permeability less than said material from which said pole piece is comprised.

12. A valve as claimed in claim 11, wherein said coating or layer is comprised of a material that has a hardness greater than said armature member.

13. An electro-magnetic valve for a fuel injection system comprising:

a housing;

a pair of spaced apart poles with one of said poles disposed at one end of said housing and another one of said poles disposed at the other end of said housing with said housing and said poles defining a chamber therein, each said pole comprising an outer flange spaced from an inner land and defining a pocket therebetween;

an armature having a pair of spaced apart ends, said armature movable in said chamber between said lands and immersed in fuel during operation of the valve;

a pair of solenoid coils with one of said solenoid coils disposed in said pocket in said one of said pole pieces and another one of said solenoid coils disposed in said pocket in said another one of said pole pieces, wherein during operation of the valve electrical current is applied to one of said solenoid coils to urge said armature toward one of said lands;

a pair of spacers comprised of a material that is harder than said armature, harder than said lands, and which has a magnetic permeability less than one of said armature and said poles;

wherein one of said spacers is disposed between said one of said lands and one of said ends of said armature and another of said spacers is disposed between said another of said lands and another of said ends of said armature; and wherein for each one of said pole pieces said inner land has an axial height that is less than said outer flange and each said spacer has a thickness substantially equal to or greater than a difference between said axial height of said inner land and said axial heigt of said outer flange.

14. The valve of claim 13 wherein each said spacer is comprised of material that is bonded to one end of said armature or one of said inner lands and each said outer flange bounds one of said spacers.

15. The valve of claim 14 wherein each said spacer is comprised of a material that is spray bonded to one of said lands.

16. The valve of claim 14 wherein each said spacer is comprised of tungsten carbide and has a thickness of between 0.05 mm and 0.3 mm.

17. The valve of claim 13 wherein a) each said outer flange has an axial end face, each said spacer has an axial end face, b) one of said spacers is disposed adjacent one of said outer flanges with i) said end face of said one of said spacers substantially coplanar with said end face of said one of said outer flanges and ii) said end face of said one of said spacers and said end face of said one of said outer flanges comprise commonly machined surfaces, and c) another one of said spacers is disposed adjacent another one of said outer flanges with i) said end face of said another one of said spacers substantially coplanar with said end face of said another one of said outer flanges and ii) said end face of said another one of said spacers and said end face of said another one of said outer flanges comprise commonly machined surfaces.

18. An electro-magnetic valve for a fuel injection system comprising:

a housing;

a pair of spaced apart poles with one of said poles disposed at one end of said housing and another one of said poles disposed at the other end of said housing with said housing and said poles defining a chamber therein, each said pole comprising an outer flange spaced from an inner land and defining a pocket therebetween;

an armature having a pair of spaced apart ends, said armature movable in said chamber between said lands and immersed in fuel during operation of the valve;

a pair of solenoid coils with one of said solenoid coils disposed in said pocket in said one of said pole pieces and another one of said solenoid coils disposed in said pocket in said another one of said pole pieces, wherein during operation of the valve electrical current is applied to one of said solenoid coils to urge said armature toward one of said lands;

a pair of spacers comprised of a material that is harder than said armature, harder than said lands, and which has a magnetic permeability less than one of said armature and said poles;

wherein one of said spacers is disposed between said one of said lands and one of said ends of said armature and another of said spacers is disposed between said another of said lands and another of said ends of said armature;

wherein for each one of said pole pieces said inner land has an axial height that is less than said outer flange and each said spacer has a thickness substantially equal to a difference between said axial height of said inner land and said axial height of said outer flange; and wherein a) each said outer flange has an axial end face and each said spacer has an axial end face, b) one of said spacers is disposed adjacent one of said outer flanges with i) said end face of said one of said spacers substantially coplanar with said end face of said one of said outer flanges and ii) said end face of said one of said spacers and said end face of said one of said outer flanges comprise commonly machined surfaces, and c) another one of said spacers is disposed adjacent another one of said outer flanges with i) said end face of said another one of said spacers substantially coplanar with said end face of said another one of said outer flanges and ii) said end face of said another one of said spacers and said end face of said another one of said outer flanges comprise commonly machined surfaces.

19. The valve of claim 18 wherein each said spacer is comprised of tungsten carbide spray bonded to one of said lands and has a thickness of between 0.05 mm and 0.3 mm.

* * * * *